United States Patent
Prasky et al.

(10) Patent No.: US 9,792,120 B2
(45) Date of Patent: Oct. 17, 2017

(54) ANTICIPATED PREFETCHING FOR A PARENT CORE IN A MULTI-CORE CHIP

(71) Applicant: International Business Machines Corporation, Armonk, NY (US)

(72) Inventors: Brian R. Prasky, Campbell Hall, NY (US); Fadi Y. Busaba, Poughkeepsie, NY (US); Steven R. Carlough, Wappingers Falls, NY (US); Christopher A. Krygowski, Lagrangeville, NY (US); Chung-lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 13/785,394

(22) Filed: Mar. 5, 2013

(65) Prior Publication Data
US 2014/0258681 A1 Sep. 11, 2014

(51) Int. Cl.
*G06F 15/00* (2006.01)
*G06F 7/38* (2006.01)
(Continued)

(52) U.S. Cl.
CPC ........ *G06F 9/30145* (2013.01); *G06F 8/4442* (2013.01); *G06F 9/30047* (2013.01);
(Continued)

(58) Field of Classification Search
None
See application file for complete search history.

(56) References Cited

U.S. PATENT DOCUMENTS 6,470,427 B1   10/2002   Arimilli et al.
6,560,693 B1    5/2003   Puzak et al.
(Continued)

FOREIGN PATENT DOCUMENTS

JP   2008098250 A1   4/2008
JP   2010140241 A    6/2010
JP   2010217992 A    9/2010

OTHER PUBLICATIONS

Ganusov et al. (Efficient Emulation of Hardware Prefetchers via Event-Driven Helper Threading, Sep. 2006, pp. 144-153).*

(Continued)

*Primary Examiner* — George Giroux
(74) *Attorney, Agent, or Firm* — Cantor Colburn LLP; William A. Kinnaman, Jr.

(57) ABSTRACT

Embodiments relate to prefetching data on a chip having a scout core and a parent core coupled to the scout core. The method includes determining that a program executed by the parent core requires content stored in a location remote from the parent core. The method includes sending a fetch table address determined by the parent core to the scout core. The method includes accessing a fetch table that is indicated by the fetch table address by the scout core. The fetch table indicates how many of pieces of content are to be fetched by the scout core and a location of the pieces of content. The method includes based on the fetch table indicating, fetching the pieces of content by the scout core. The method includes returning the fetched pieces of content to the parent core.

8 Claims, 5 Drawing Sheets

(51) Int. Cl.
  *G06F 9/00* (2006.01)
  *G06F 9/44* (2006.01)
  *G06F 9/30* (2006.01)
  *G06F 9/45* (2006.01)
  *G06F 12/0862* (2016.01)
  *G06F 9/38* (2006.01)

(52) U.S. Cl.
  CPC ............ *G06F 9/383* (2013.01); *G06F 9/3889* (2013.01); *G06F 12/0862* (2013.01)

(56) References Cited

U.S. PATENT DOCUMENTS

| | | | |
|---|---|---|---|
| 7,509,481 | B2 | 3/2009 | Chaudhry et al. |
| 7,730,263 | B2 | 6/2010 | Burtscher et al. |
| 7,950,012 | B2 | 5/2011 | Tirumalai et al. |
| 7,962,314 | B2 | 6/2011 | Chernoff |
| 7,975,107 | B2 | 7/2011 | Beckmann et al. |
| 8,196,147 | B1 | 6/2012 | Srinivasan et al. |
| 2002/0087800 | A1 | 7/2002 | Abdallah et al. |
| 2004/0148491 | A1* | 7/2004 | Damron ............... G06F 8/4442 712/34 |
| 2005/0063725 | A1 | 3/2005 | Matsukura |
| 2006/0155963 | A1 | 7/2006 | Bohrer et al. |
| 2007/0124608 | A1 | 5/2007 | Knowlson et al. |
| 2007/0150766 | A1 | 6/2007 | Kuwahara |
| 2007/0156971 | A1 | 7/2007 | Sistla et al. |
| 2008/0059715 | A1 | 3/2008 | Tomita et al. |
| 2008/0141268 | A1 | 6/2008 | Tirumalai et al. |
| 2009/0091182 | A1 | 4/2009 | Tamada et al. |
| 2009/0198948 | A1 | 8/2009 | Arimilli et al. |
| 2009/0198950 | A1 | 8/2009 | Arimilli et al. |
| 2009/0199181 | A1 | 8/2009 | Arimilli et al. |
| 2010/0042786 | A1 | 2/2010 | Bell et al. |
| 2010/0208724 | A1 | 8/2010 | Booth et al. |
| 2010/0241811 | A1 | 9/2010 | Solihin |
| 2010/0281282 | A1 | 11/2010 | Sawyers |
| 2010/0293312 | A1 | 11/2010 | Sonnier et al. |
| 2010/0299496 | A1 | 11/2010 | Arimilli et al. |
| 2011/0035551 | A1 | 2/2011 | Hooker et al. |
| 2011/0055805 | A1 | 3/2011 | Herdeg et al. |
| 2011/0109937 | A1 | 5/2011 | Fujiki et al. |
| 2011/0113199 | A1 | 5/2011 | Tang et al. |
| 2011/0125971 | A1 | 5/2011 | Kruglick |
| 2011/0167416 | A1 | 7/2011 | Sager et al. |
| 2011/0231612 | A1* | 9/2011 | Karlsson et al. ............. 711/119 |
| 2011/0283067 | A1 | 11/2011 | Chen et al. |
| 2011/0296431 | A1 | 12/2011 | Gschwind et al. |
| 2012/0006978 | A1 | 1/2012 | Ludwig |
| 2012/0127518 | A1 | 5/2012 | Ogata et al. |
| 2012/0246406 | A1* | 9/2012 | Bell .................... G06F 12/0831 711/119 |
| 2013/0061076 | A1 | 3/2013 | Versteeg |
| 2015/0019841 | A1 | 1/2015 | Prasky et al. |

OTHER PUBLICATIONS

UK Internation Search Report and Written Opinion for International Application No. PCT/IB2014/058939; International Filing Date: Feb. 2, 2014; dated May 13, 2014; 6 pages.

UK International Serach Report and Written Opinion for International Application No. PCT/IB2014/058955; International Filing Date: Feb. 13, 2014; dated Jun. 16, 2014; 10 pages.

J. Lee, et al., "Prefetching with Helper Threads for Loosely Coupled Multiprocessor Systems." IEEE Transactions on Parallel and Distributed Systems: 2009, pp. 1-16; vol. 20.

Darouich et al., "Service de Configuration Predictif pour Plateforme Multicoeur Reconfigurable Heterogene," RenPar'18/SympA'2008/CFSE'6, version 1-4, Jan. 2008.

Chaudhry et al., "High-Performance Throughput Computing," IEEE Computer Society, May-Jun. 2005, pp. 32-45.

U.S. Appl. No. 13/785,369; Non-Final Office Action, Date Filed: Mar. 5, 2013, dated Nov. 6, 2014; 22 pages.

U.S. Appl. No. 13/785,377; Non-Final Office Action; Date Filed: Mar. 5, 2013; dated Oct. 23, 2014; 19 pages.

U.S. Appl. No. 13/785,389; Non-Final Office Action, Date Filed: Mar. 5, 2013; dated Nov. 7, 2014; 21 pages.

U.S. Appl. No. 14/501,661; Non-Final Office Action, Date Filed: Sep. 30, 2014; dated Nov. 6, 2014; 19 pages.

U.S. Appl. No. 14/501,697, Non-Final Office Action, Date Filed: Sep. 30, 2014; dated Oct. 24, 2014; 13 pages.

U.S. Appl. No. 14/501,757; Non-Final Office Action; Date Filed: Sep. 30, 2014; dated Nov. 6, 2014; 18 pages.

Ganusov et al., "Efficient Emulation of Hardward Prefetchers via Event-Driven Helper Threading" Sep. 2006, pp. 144-153.

U.S. Appl. No. 14/501,624; Non-Final Office Action, Date Filed: Sep. 30, 2014; dated Jul. 7, 2015; 32 pages.

* cited by examiner

ANTICIPATED PREFETCHING FOR A PARENT CORE IN A MULTI-CORE CHIP

BACKGROUND

The present disclosure relates generally to multi-core chips having a parent core and a scout core, and more specifically, to a parent core notifying a scout core of anticipated prefetches in a multi-core chip.

Single thread processor performance growth has been limited due to power requirements needed for single thread performance. Doubling the power requirements of a processor through increased frequency and/or functional features does not necessarily yield a performance gain greater than or equal to the increased power requirement. This is because the performance gain to power gain ratio is significantly skewed. To provide chip performance growth, significant portions of the power budget may be devoted to placing additional cores on a chip. While cache and memory sharing prevents the performance increase from being equal to the ratio increase in the number of cores, the performance gain for increasing a core count on the chip may yield a greater performance/watt gain than solely improving the performance of a single core processor.

In one approach to enhance single thread performance, a secondary core on the same chip as a primary or parent core may be leveraged as a scout core. Specifically, the scout core may be used to prefetch data from a shared cache into the parent core's private cache. This approach may be especially useful in the event the parent core encounters a cache miss. A cache miss occurs when a particular line of data causes a search of a directory of the parent core, and the requested line of cache is not present. One typical approach to obtain the missing cache line is to initiate a fetch operation to a higher level of cache. The scout core provides a mechanism that is used to prefetch data needed by the parent core. Sometimes the parent core may be aware of a series of anticipated or imminent prefetches, where the data prefetched by the scout core may be used by the parent core at a later time.

SUMMARY

Embodiments relate to prefetching data on a chip having a scout core and a parent core coupled to the scout core. The system is configured to perform a method that includes determining that a program executed by the parent core requires content stored in a location remote from the parent core. The method also includes sending a fetch table address determined by the parent core to the scout core. The method also includes accessing a fetch table that is indicated by the fetch table address by the scout core. The fetch table indicates how many of pieces of content are to be fetched by the scout core and a location of the pieces of content. The method further includes based on the fetch table indicating, fetching the pieces of content by the scout core. The method further includes returning the fetched pieces of content to the parent core.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

An embodiment for prefetching data for a parent core by a scout core in a multi-core chip is disclosed. In one exemplary embodiment, the multi-core chip includes a scout core and at least one parent core in communication with the scout core. The parent core may determine that a specific program requires data or content stored in a location remote from the parent core (e.g., a cache shared by the parent core and the scout core, or system memory). The parent core sends a fetch table address to the scout core based on the content required by the program. The scout core may then retrieve a fetch table pointed to by the fetch table address. The fetch table specifies how many pieces of content are to be fetched by the scout core as well as the location of the pieces of content on a computer system. The scout core may then fetch the pieces of content, and send the content back to the parent core. The approach as disclosed in exemplary embodiments allows the parent core to anticipate various prefetches, where the content required may be fetched by the scout core.

Figure 1:
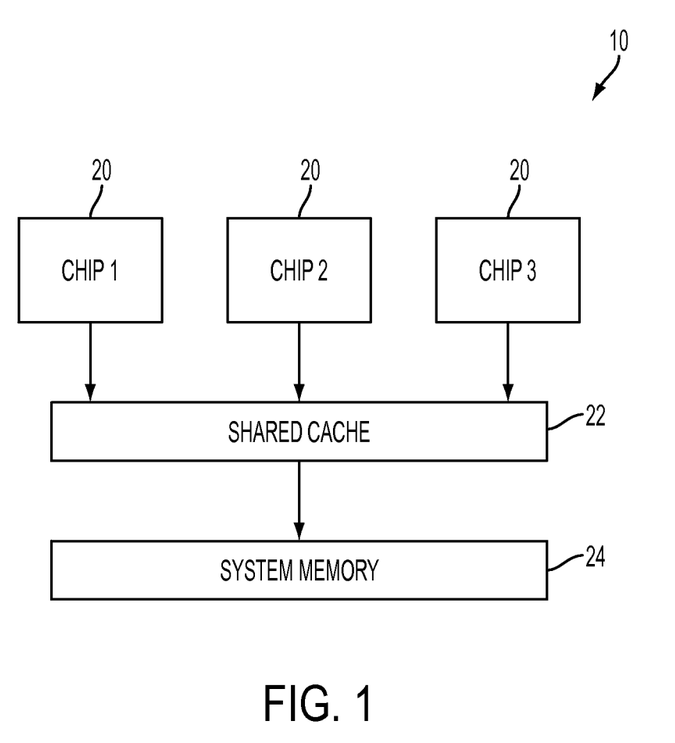
FIG. 1 depicts multi-core chips in accordance with an embodiment.

FIG. 1 illustrates an example of a computing system 10 in accordance with one embodiment. The computing system 10 includes at least one central processing (CP) chip 20. In the exemplary embodiment as shown in FIG. 1, three CP chips 20 are shown, however it is to be understood that any number of CP chips 20 may be used as well. For example, in one approach, the computing system 10 may include eight CP chips 20. In another approach, the computing system 10 may include up to twelve or sixteen CP chips 20. Each CP chip 20 is in communication with a shared cache 22 and a system memory 24.

Figure 2:
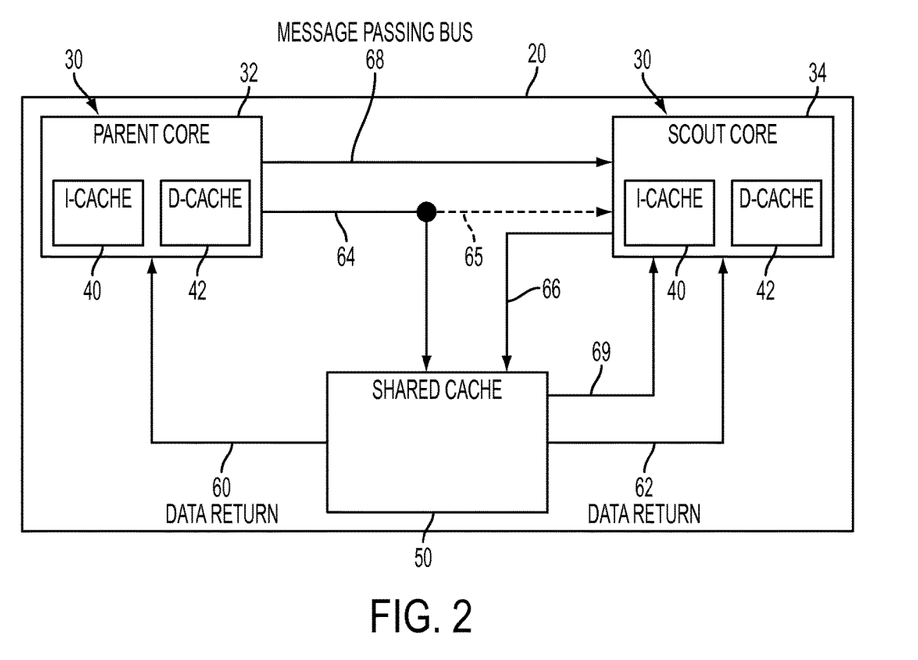
FIG. 2 depicts a central processing (CP) chip in accordance with an embodiment.

Referring now to FIGS. 1-2, each CP chip 20 includes multiple cores 30 for the reading and executing of instructions. For example, in the exemplary embodiment as shown in FIG. 2, each CP chip 20 includes a parent core 32 and a scout core 34, however it is understood that multiple parent cores 32 may be located on the CP chip 20 as well. Each core 30 also includes a respective instruction cache or I-cache 40 and a data cache or D-cache 42. In the exemplary embodiment as shown in FIG. 2, the cores 30 each include only a level one (L1) cache, however it is to be understood that in various embodiments the cores 30 may also include a level two (L2) cache as well. Each core 30 is operatively coupled to a shared cache 50. In the embodiment as shown in FIG. 2, the shared cache 50 is an L2 cache, however it is to be understood that the shared cache 50 may also be a level three (L3) cache as well.

A data return bus 60 is provided between the parent core 32 and the shared cache 50, and a data return bus 62 is provided between the scout core 34 and the shared cache 50.

A fetch request bus 64 connects the parent core 32 with the shared cache 50, where a fetch address and supporting data is sent from the parent core 32 to the shared cache 50. In one embodiment, the fetch request bus 64 may also connect the parent core 32 directly with the scout core 34 as well, which is indicted by phantom line 65. A fetch request bus 66 connects the scout core 34 with the shared cache 50, where a fetch address and supporting data is sent from the scout core 34 to the shared cache 50. This is similar in behavior to fetch request bus 64 fetching for the parent core 32. Such fetching may be required for loading of one or more prefetching algorithms into the scout core's 34 I-cache 40 along with potentially needing to load in further data into the scout core's 34 D-cache 42 for the prefetch table. A message passing bus 68 is located between the parent core 32 and the scout core 34. The parent core 32 informs the scout core 32 of a fetch table address and access type (e.g. instruction fetch for the I-cache, data fetch for the D-cache, meta-data fetch for a meta-data cache) through the message passing bus 68. The fetch table address indicates a location of a fetch table stored in the D-cache 42 of the scout core 34. The fetch table indicates where data or content (e.g., one or more lines of cache) is stored. The data may be stored in a variety of different locations in the computing system 10 that are memory address accessible such as, for example, the chip shared cache 50, the system shared cache 22 (FIG. 1), or the system memory 24 (FIG. 1). Finally, a fetch request bus 69 connects the scout core 34 with the shared cache 50, where data may be sent from the parent core 32 to the scout core 34 through the shared cache 50 and the fetch request bus 69.

In the exemplary embodiment as illustrated in FIG. 2, the shared cache 50 acts as a hub or a connection between the scout core 34 and the parent core 32. The scout core 34 may send data or content to the parent core 32 through the shared cache 50. However, in the event the scout core 34 supports a single parent core 32, a direct connection (e.g., a bus) may be used to send data from the scout core 34 to the parent core 32.

The parent core 32 executes one or more programs. Upon execution of a specific region of code in the program, the parent core 32 may determine that the program requires data or content stored in a location that is not in the parent core 32. That is, the content is not stored in the parent core's 32 own L1 I-cache 40 or D-cache 42. Instead, the content may be stored in a location remote from the parent core 32 (e.g., the shared chip cache 50, the shared system cache 22 shown in FIG. 1, or the shared memory 24 shown in FIG. 1). The parent core 32 may send the fetch table address through the message passing bus 68 to the scout core 34. The fetch table address may be determined by the parent core 32 during compile time. In particular, a specific instruction is placed into an instruction sequence stating a prefetch table is to be accessed.

Upon receiving the fetch table address from the parent core 32, the scout core 34 may then access the respective D-cache 42 (e.g., the scout core's 34 own D-cache 42) to retrieve the fetch table pointed to by the fetch table address. The fetch table indicates prefetch addresses where the content is stored, as well as the number of prefetch addresses that the scout core 34 is to fetch for. The scout core 34 fetches the content from a location that is remote from the scout core 34 (e.g., the chip shared cache 50, the system shared cache 22 shown in FIG. 1, or the shared memory 24 shown in FIG. 1). That is, the scout core 34 is used for fetching addresses so as to have the data returned to the parent core 32.

The fetch table may specify the location of where the content is stored, as well as how many pieces of content are to be fetched by the scout care 34. The pieces of content may be a specific set of data such as, for example, one or more lines of cache. The fetching and return of data are pipelined, where after the scout core 34 fetches a piece of content, the data is then returned to the parent core 32, (e.g., the data is sent back to the parent core piece by piece, there is no need to wait for all fetches to be made before return to the parent core 32.

Figure 3:
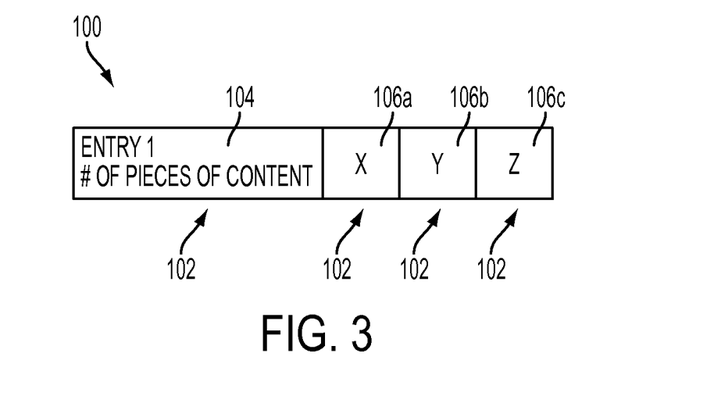
FIG. 3 depicts a fetch table in accordance with an embodiment.

In one approach, the fetch table may include a series of addresses indicating the specific or precise locations of where the content is stored. Specifically, with reference to FIG. 3, an exemplary address fetch table 100 is illustrated, where the address fetch table 100 includes multiple entries 102. A first entry in the address fetch table 100 is an entry number indicator 104, and specifies how many pieces of content (e.g., lines of cache) are to be read from the address fetch table 100. For example, FIG. 3 illustrates three different location entries 106a, 106b, and 106c. The location entries 106a-106c specify specific addresses where the pieces of content are stored. For example, the addresses 'X', 'Y', and 'Z' could specify a precise or exact location where a specific line or lines of cache are stored in the chip shared cache 50 (FIG. 2), or a location further away from the scout core 34 as well (e.g., the system memory 24 shown in FIG. 1). Moreover, it is to be understood that the entry number indicator 104 is defined to be a given size based on the architecture of the system. The location entries 106a-106c are also defined to be a given size based on the architecture.

In an alternative approach, the fetch table may receive a base address, and include offsets from the base address to define the location of where the content is stored. Referring to FIG. 2, in this approach, the fetch request bus 64 may connect the parent core 32 directly to the scout core 34 (indicted by phantom line 65). The parent core 32 may send the scout core 32 the base address through the fetch request bus 65 and the table address through the messaging passing bus 68 in the event the message passing bus 68 is not wide enough to support two pieces of data. Alternatively, the fetch request bus 64 may connect the parent core 32 with the shared cache 50. The base address is sent from the parent core 32 to the shared cache 50. The scout core 34 receives the base address from the shared cache 50 through the fetch request bus 69.

Figure 4:
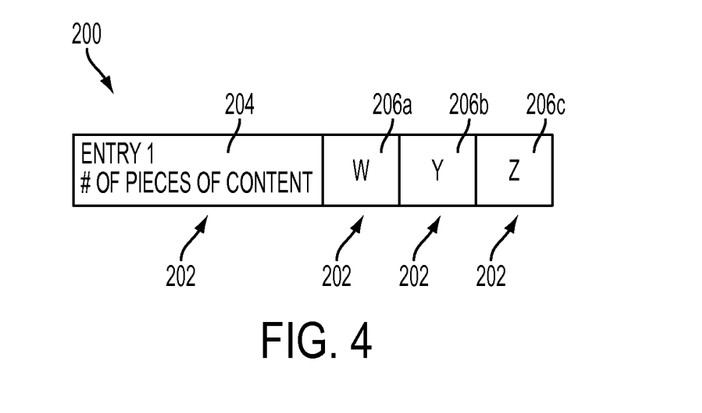
FIG. 4 depicts another fetch table in accordance with yet another embodiment.

Referring now to FIG. 4, an exemplary offset fetch table 200 is illustrated, where the offset fetch table 200 includes multiple entries 202. A first entry in the offset fetch table 200 is an entry number indicator 204, and specifies how many pieces of content (e.g., addresses of lines of cache) are to be read from the offset fetch table 200. For example, FIG. 4 illustrates three different location entries 206.

The location entries 206a, 206b, and 206c specify addresses where the pieces of content are stored. Specifically, a base address (e.g., 'X') is sent to the scout core 32, and location entries 206a, 206b and 206c specify offsets from the base address 'X'. Specifically, location entry 206a specifies 'W' where 'W' represents an offset from the base address 'X' (e.g., the offset 'W' may represent an offset distance in a defined memory space located within the architecture of the computing system 10 (FIG. 1). Location entry 206b specifies 'Y', where 'Y' represents an offset from the base address 'X'. Location entry 206c specifies 'Z' where 'Z' represents another offset from the base address 'X' (e.g., offset 'W' represents an offset often fields from base address 'X' in memory space, offset 'Y' represents an offset of twenty-five fields from base address 'X' in memory space, and offset 'Z' represents an offset of fifty fields in memory space). Thus, the scout core 34 (FIG. 2) may compute the specific addresses where content is located based on the base address 'X' and the offset 'W', 'Y' or 'Z'. It is to be understood that the entry number indicator 204 is defined to be a given size based on the architecture of the system. The location entries 206*a*-206*c* are also defined to be a given size based on the architecture. It should also be noted that the location entries 106*a*-106*c* in FIG. 3 and the location entries 206*a*-206*c* may be different sizes from one another, but all the location entries 106*a*-106*c* are the same size, and all the location entries 206*a*-206*c* are also the same size.

Figure 5:
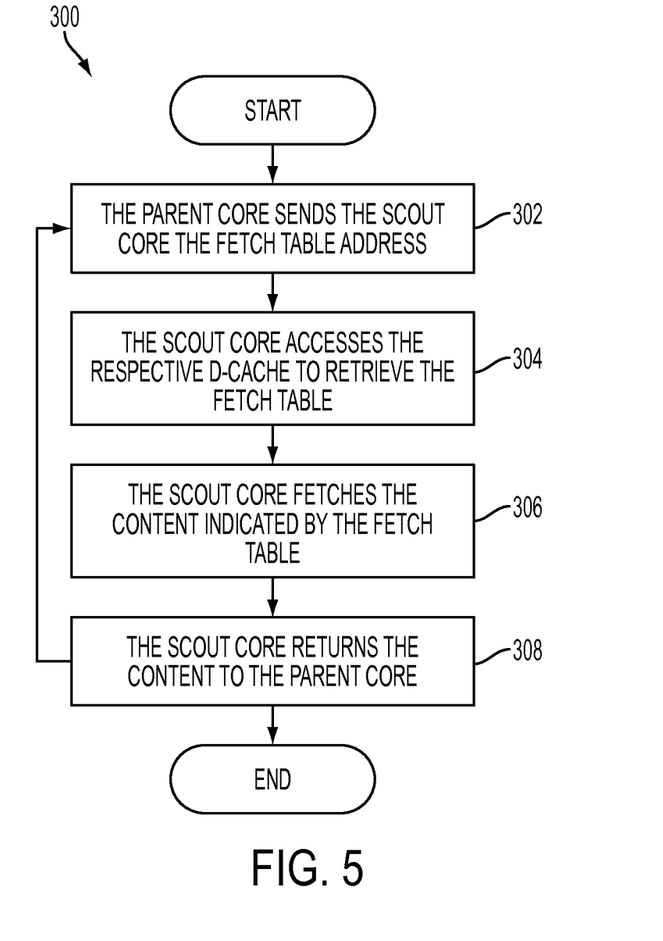
FIG. 5 depicts a process flow for illustrating a method of operation for fetching data by the scout core in accordance with an embodiment.

FIG. 5 is a process flow diagram illustrating a method 300 of prefetching data by the scout core 32 from a remote location (e.g., the chip shared cache 50, the system shared cache 22 shown in FIG. 1, or the shared memory 24 shown in FIG. 1) based on the addresses sent by the parent core 32. Referring to FIGS. 1-5, method 100 begins at block 302, where the parent core 32 sends the scout core the fetch table address through the message passing bus 68. The fetch table may indicate the address fetch table 100 shown in FIG. 3, or the offset fetch table 200 shown in FIG. 4. Method 300 may then proceed to block 304.

In block 304, upon receiving the fetch table address from the parent core 32, the scout core 34 may then access the respective D-cache 42 to retrieve the fetch table pointed to by the fetch table address. Method 300 may then proceed to block 306.

In block 306, the scout core 34 fetches the content indicated by the fetch table. Referring to FIG. 3, the entry number indicator 104 specifies how many pieces of content (e.g., lines of cache) are to be read from the address fetch table 100, and the location entries 106 specify specific addresses where content is stored. The scout core 34 may continue to make prefetches to the specific addresses where the pieces of content are stored, until all the pieces of content have been fetched.

Referring to FIG. 4, if the fetch table specifies offsets 'W', 'Y' and 'Z' from the base address 'X', then the scout core 34 (FIG. 2) computes the addresses where content is located based on the base address 'X' and the offset 'W', 'Y' or 'Z'. The scout core 34 may then make prefetches to the computed address where the pieces of content are stored, until all the pieces of content have been fetched. Method 300 may then proceed to block 308.

In block 308, after the scout core 34 fetches a piece content indicated by the fetch table, the scout core 34 may then return the content to the parent core 32 through the shared cache 50. Specifically, the fetching and return of data are pipelined, where after the scout core 34 fetches a piece of content, the data is then returned to the parent core 32. Once the content is returned to the parent core 32, the scout core 34 may monitor the message passing bus 68 for another fetch table sent from the parent core 32. Method 300 may then terminate, or return to block 302.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
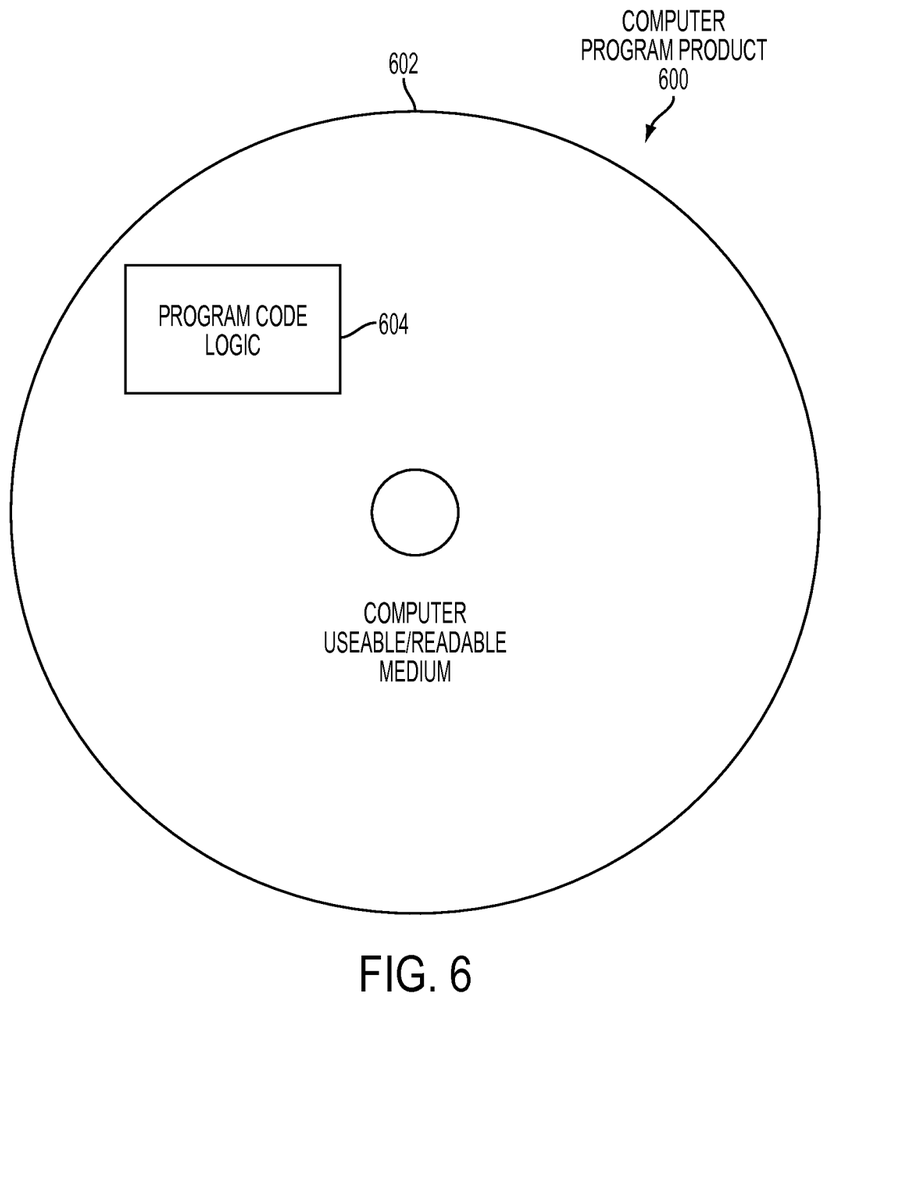
FIG. 6 illustrates a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments relate to prefetching data on a chip having a scout core and at least one parent core coupled to the scout core. The method includes determining whether a program executed by the at least one parent core requires content stored in a location remote from the at least one parent core. The method includes sending a fetch table address determined by the at least one parent core to the scout core. The method includes accessing a fetch table that is indicated by the fetch table address by the scout core. The fetch table indicates how many of pieces of content are to be fetched by the scout core and a location of the pieces of content on a computer system. The method includes based on the fetch table indicating, fetching the pieces of content by the scout core. The method includes returning the fetched pieces of content to the at least one parent core.

In an embodiment, the fetch table is an address fetch table that includes a series of addresses indicating a specific location of where the pieces of content are stored on the computer system.

In another embodiment, the fetch table is an offset address table that includes at least one offset from the base address.

In yet another embodiment, the scout core computes a specific location of where the pieces of content are stored on the computer system based on the base address and the at least one offset from the offset address table.

In another embodiment, a message passing bus that connects the at least one parent core to the scout core is included, and the fetch table address is sent through the message passing bus.

In yet another embodiment, a shared cache that is common between the at least one scout core and the at least one parent core is included. The shared cache is located on the chip.

In another embodiment, the pieces of content are stored in the shared cache.

In yet another embodiment, the pieces of content are stored on a system memory.

Technical effects and benefits include of the computing system 10 as described above include prefetching data needed by the parent core 32 when executing a program, where the scout core 34 may fetch the data needed by the parent core 32. Specifically, the fetch table indicates how many pieces of content are to be fetched by the scout core as well as the location of the pieces of content. Thus, the approach as described above will allow the parent core 32 to anticipate various prefetches, where the content required may be sent to the scout core 34 using either the address fetch table 100 (FIG. 3) or the offset fetch table 200 (FIG. 4).

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for prefetching data, the system comprising:
   a chip, comprising:
      a scout core;
      a parent core coupled to the scout; and
      a shared cache that is common between the scout core and the parent core, the system configured to perform a method comprising:
         determining that a program executed by the parent core requires content stored in the shared cache;
         sending, from the parent core to the scout core, a fetch table address determined by the parent core via a message passing bus based on determining that content in the shared cache is required, wherein the fetch table address determined by the parent core during compile time and the fetch table address indicates a location of a fetch table;

receiving, by the scout core, the fetch table address;

accessing the fetch table by the scout core, the fetch table indicating how many of pieces of content are to be fetched by the scout core and a location of the pieces of content, the accessing in response to the receiving;

fetching the pieces of content indicated by the fetch table, the fetching by the scout core and in response to the accessing; and returning the fetched pieces of content to the parent core via the shared cache.

2. The computer system of claim 1, wherein the fetch table is an address fetch table that includes a series of addresses indicating a specific location of where the pieces of content are stored on the computer system.

3. The computer system of claim 1, wherein the fetch table is an offset address table that includes at least one offset from a base address.

4. The computer system of claim 3, wherein the scout core computes a specific location of where the pieces of content are stored on the computer system based on the base address and the at least one offset.

5. The computer system of claim 1, comprising a message passing bus that connects the parent core to the scout core, and wherein the fetch table address is sent through the message passing bus.

6. The computer system of claim 1, comprising a shared cache that is common between the at least one scout core and the parent core, wherein the shared cache is located on the chip.

7. The computer system of claim 6, wherein the pieces of content are stored in the shared cache.

8. The computer system of claim 1, wherein the pieces of content are stored on a system memory.

* * * * *